(12) United States Patent
Papke et al.

(10) Patent No.: US 7,843,140 B2
(45) Date of Patent: Nov. 30, 2010

(54) AC SWITCH WITH ZERO OFF CURRENT FOR EL PANEL

(75) Inventors: Christopher Eric Papke, Mesa, AZ (US); Harold Gee Yee, Chandler, AZ (US); Robert Allen Kimball, Gilbert, AZ (US)

(73) Assignee: Rogers Corporation, Rogers, CT (US)

( * ) Notice: Subject to any disclaimer, the term of this patent is extended or adjusted under 35 U.S.C. 154(b) by 577 days.

(21) Appl. No.: 11/260,048

(22) Filed: Oct. 27, 2005

(65) Prior Publication Data

US 2007/0097039 A1     May 3, 2007

(51) Int. Cl.
*G09G 3/10* (2006.01)
*H02M 3/24* (2006.01)

(52) U.S. Cl. ............... 315/169.3; 315/209 R; 363/97

(58) Field of Classification Search ........... 345/82, 345/92, 76, 102, 45; 363/147, 40, 41, 97, 363/98, 131; 315/209 R, 307, 291, 160, 315/174, 176, 223–226, 169.1–169.3
See application file for complete search history.

(56) References Cited

U.S. PATENT DOCUMENTS

| 4,210,848 | A | | 7/1980 | Suzuki et al. ............ 315/169.3 |
|---|---|---|---|---|
| 4,954,752 | A | * | 9/1990 | Young et al. .............. 315/169.3 |
| 5,313,141 | A | | 5/1994 | Kimball ................... 315/169.3 |
| 5,336,978 | A | * | 8/1994 | Alessio ..................... 315/169.3 |
| 5,347,198 | A | | 9/1994 | Kimball ....................... 315/167 |
| 5,349,269 | A | * | 9/1994 | Kimball ................... 315/169.3 |
| 5,416,387 | A | * | 5/1995 | Cuk et al. ................ 315/209 R |
| 6,091,164 | A | * | 7/2000 | Buell .......................... 307/82 |
| 6,204,609 | B1 | * | 3/2001 | Kimball ................... 315/169.3 |
| 6,259,619 | B1 | * | 7/2001 | Buell .......................... 363/147 |
| 6,462,485 | B1 | * | 10/2002 | Kimball ................... 315/169.3 |
| 6,597,123 | B1 | * | 7/2003 | Buell et al. .............. 315/169.3 |
| 7,046,225 | B2 | * | 5/2006 | Chou .......................... 345/92 |
| 7,049,762 | B2 | * | 5/2006 | Newton ..................... 315/246 |
| 7,190,600 | B1 | * | 3/2007 | Ung et al. ................... 363/131 |
| 2005/0269969 | A1 | * | 12/2005 | Van Casteren .............. 315/291 |

* cited by examiner

*Primary Examiner*—Jacob Y Choi
*Assistant Examiner*—Jimmy T Vu
(74) *Attorney, Agent, or Firm*—Paul F. Wille

(57) ABSTRACT

A power supply for driving an EL panel includes an inverter that produces a polarity reversing voltage at a pair of output terminals. A switching circuit coupled to the output terminals and to at least one EL lamp applies alternating current to the at least one EL lamp in the on state and blocks current from the EL lamp in the off state. The switching circuit includes a first bidirectional switch connecting a first terminal of the EL lamp to a first output terminal and a second bidirectional switch connecting a second terminal of the EL lamp to a second output terminal.

8 Claims, 2 Drawing Sheets

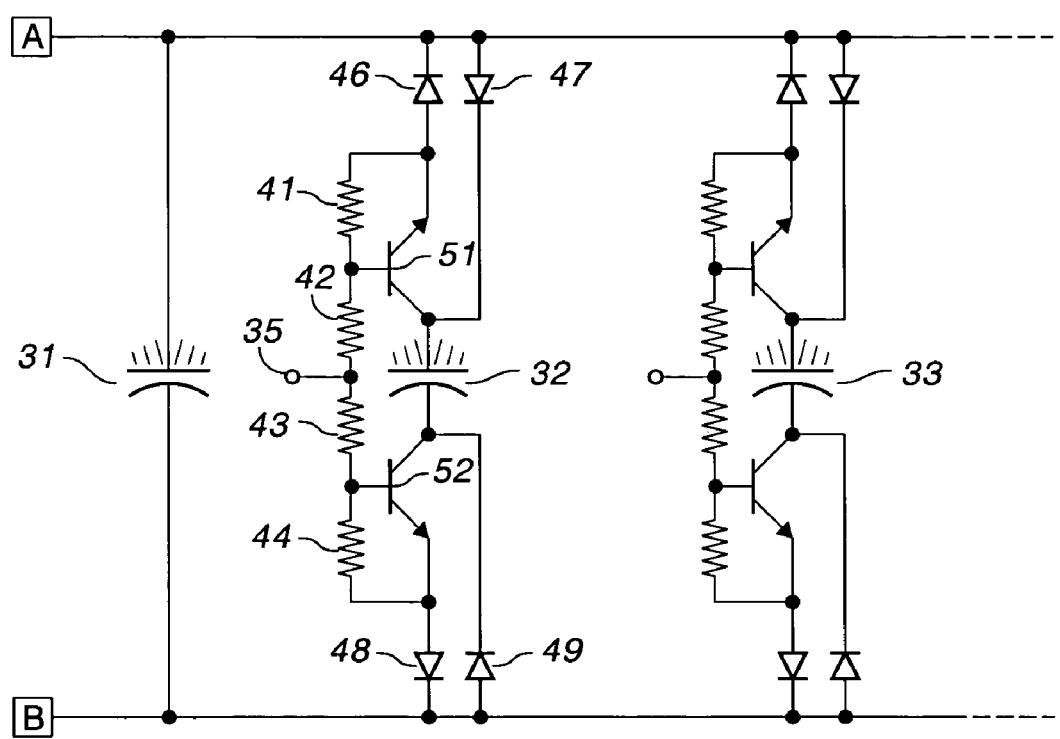
F I G. 3

AC SWITCH WITH ZERO OFF CURRENT FOR EL PANEL

BACKGROUND OF THE INVENTION

This invention relates to battery operated inverters and, in particular, to a switching circuit for selectively coupling an EL panel to a source of power and providing substantially zero off current to the panel.

As used herein, a bridge is a circuit having four arms with two pairs of arms connected in parallel between a first pair of terminals. In each pair of arms, the arms are connected in series. The junctions of the arms in each series pair are a second pair of terminals. With unidirectional current elements in the arms and alternate arms conducting simultaneously, a bridge has a DC diagonal across one pair of terminals and an AC diagonal across the second pair of terminals.

As used herein, and as understood by those of skill in the art, "thick film" refers to one type of EL lamp and "thin film" refers to another type of EL lamp. The terms only broadly relate to actual thickness and actually identify distinct disciplines. In general, thin film EL lamps are made by vacuum deposition of the various layers, usually on a glass substrate or on a preceding layer. Thick film EL lamps are generally made by depositing layers of inks on a substrate, e.g. by roll coating, spraying, or various printing techniques. The techniques for depositing ink are not exclusive, although the several lamp layers are typically deposited in the same manner, e.g. by screen printing. A thin, thick film EL lamp is not a contradiction in terms and such a lamp is considerably thicker than a thin film EL lamp.

As used herein, an EL "panel" is a single sheet including one or more luminous areas, wherein each luminous area is an EL "lamp." An EL lamp is essentially a capacitor having a dielectric layer between two conductive electrodes, one of which is transparent. The dielectric layer can include phosphor particles or there can be a separate layer of phosphor particles adjacent the dielectric layer. The phosphor particles radiate light in the presence of a strong electric field, using relatively little current.

In the context of a thick film EL lamp, and as understood by those of skill in the art, "inorganic" refers to a crystalline, luminescent material that does not contain silicon or gallium as the host crystal. (A crystal may be doped accidentally, with impurities, or deliberately. "Host" refers to the crystal itself, not a dopant.) The term "inorganic" does not relate to the other materials from which an EL lamp is made.

EL phosphor particles are typically zinc sulfide-based materials, including one or more compounds such as copper sulfide ($Cu_2S$), zinc selenide (ZnSe), and cadmium sulfide (CdS) in solid solution within the zinc sulfide crystal structure or as second phases or domains within the particle structure. EL phosphors typically contain moderate amounts of other materials such as dopants, e.g., bromine, chlorine, manganese, silver, etc., as color centers, as activators, or to modify defects in the particle lattice to modify properties of the phosphor as desired. The color of the emitted light is determined by doping level. Although understood in principle, the luminance of an EL phosphor particle is not understood in detail. The luminance of the phosphor degrades with time and usage, more so if the phosphor is exposed to moisture or high frequency (greater than 1,000 hertz) alternating current.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being, preferred. Ionic migration occurs in the phosphor at frequencies below 200 hertz. Above 1000 hertz, the life of the phosphor is inversely proportional to frequency.

A suitable voltage can be obtained from an inverter using a transformer. For a small panel, a transformer is relatively expensive. The prior art discloses several types of inverters in which the energy stored in an inductor is supplied to an EL lamp as a small current at high voltage as the inductor is discharged either through the lamp or into a storage capacitor. The voltage on a storage capacitor is pumped up by a series of high frequency pulses from the inverter. Capacitive pump circuits are also known but not widely used commercially.

The direct current produced by inverter must be converted into an alternating current in order to power an EL lamp. U.S. Pat. No. 4,210,848 (Suzuki et al.) discloses a switching bridge for this purpose. The bridge acts as a double pole double throw switch to alternate current through the EL lamp at low frequency. U.S. Pat. No. 5,313,141 (Kimball) discloses an inverter that produces AC voltage directly. A plurality of inverters are commercially available using either technology.

It is known in the art to couple a plurality of EL lamps to a single supply by switches; U.S. Pat. No. 5,347,198 (Kimball). As noted in the '198 patent, there is a minuscule current flowing through an EL lamp even when the lamp is in the "off" state, theoretically disconnected from the supply. The minuscule current, corresponding to a very small DC bias, has been found to cause ionic migration. Even a small DC bias is harmful, causing shortened life compared to properly driven EL lamps.

In view of the foregoing, it is therefore an object of the invention to provide a power supply for driving an EL panel from a battery without producing a DC bias on the panel.

Another object of the invention is to provide a symmetrical drive for an EL panel.

A further object of the invention is to provide a symmetrical switching circuit that can be replicated economically to provide individual control for a plurality of lamps.

Another object of the invention is to provide a symmetrical switching circuit having zero off current through an EL lamp.

SUMMARY OF THE INVENTION

The foregoing objects are achieved in this invention in which a power supply for driving an EL panel includes an inverter that produces a polarity reversing voltage at a pair of output terminals. A switching circuit coupled to the output terminals and to at least one EL lamp applies alternating current to the at least one EL lamp in the on state and blocks current from the EL lamp in the off state. The switching circuit includes a first bidirectional switch connecting a first terminal of the EL lamp to a first output terminal and a second bidirectional switch connecting a second terminal of the EL lamp to a second output terminal.

BRIEF DESCRIPTION OF THE DRAWING

A more complete understanding of the invention can be obtained by considering the following detailed description in conjunction with the accompanying drawing, in which:

FIG. 3 is a schematic of a switching circuit constructed in accordance with a preferred embodiment of the invention.

DETAILED DESCRIPTION OF THE INVENTION

Figure 1:
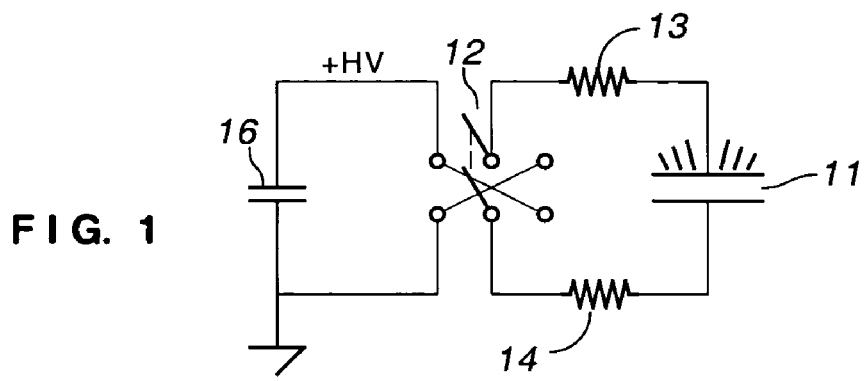
FIG. 1 illustrates the operation of a bridge circuit.

As note above, an electroluminescent lamp requires an alternating current for operation. When a direct current source is all that is available, alternately reversing the connections of an EL lamp and a source of direct current will provide an alternating current. As illustrated in FIG. 1, the terminals of EL lamp 11 are coupled to respective poles of double pole, double throw (DPDT) switch 12 through resistors 13 and 14. The throws of switch 12 are connected to capacitor 16, which stores high voltage DC from a suitable source, not shown. When switch 12 is closed to the left, voltage at a first polarity is applied to EL lamp 11. When the switch is closed to the right, the polarity of the voltage applied to EL lamp 11 is reversed, producing, over successive cycles, an alternating current through the lamp.

Figure 2:
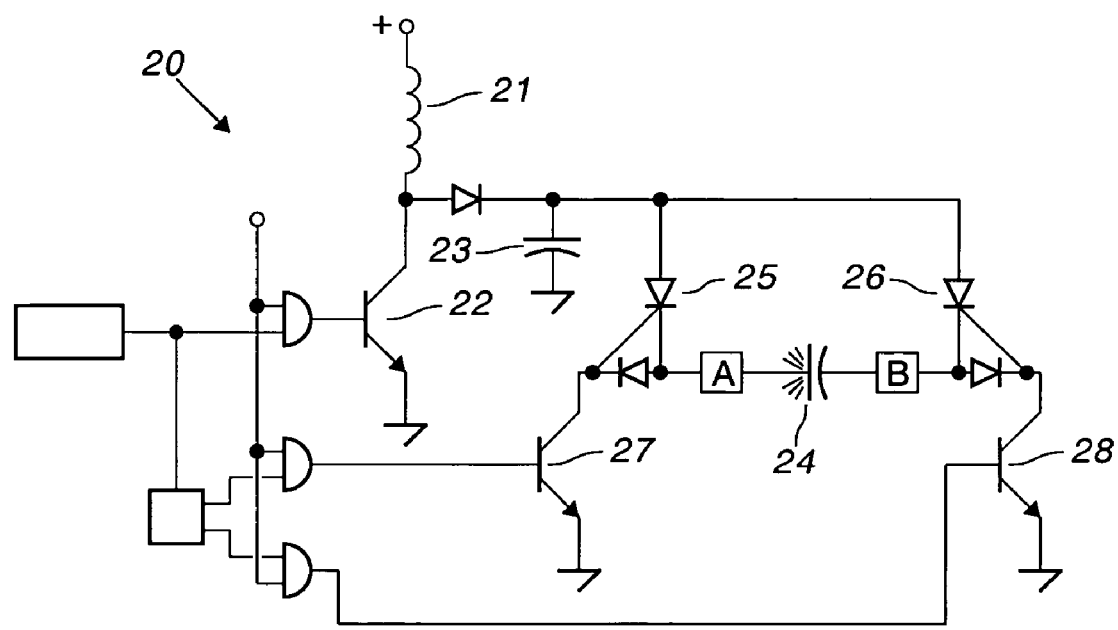
FIG. 2 is a schematic of a commercially available inverter having a bridge output.

FIG. 2 is a schematic of a commercially available inverter that includes the electronic analog of a DPDT switch. Inverter 20 includes inductor 21 and switching transistor 22 operating in a well known boost configuration to charge capacitor 23 to a high voltage. A bridge circuit includes SCR 25, SCR 26, switching transistor 27, and switching transistor 28. EL lamp 24 is connected to the AC diagonal of the bridge at output terminals A and B. Capacitor 23 is connected across the DC diagonal of the bridge. SCR 25 and transistor 28 conduct simultaneously to pass current in a first direction through EL lamp 24. SCR 26 and transistor 27 conduct simultaneously to pass current in a second direction through EL lamp 24, alternating with SCR 25 and transistor 28.

FIG. 3 is a schematic of a circuit for selectively activating lamps in an EL panel. Input terminals A and B are coupled to output terminals A and B in FIG. 2. EL lamp 31 is lit as long as power is applied to inverter 20 (FIG. 2). EL lamps 32 and 33 are selectively lit by the respective switching circuit to which each is connected. These are duplicate circuits and only the operation of lamp 32 is described. The switching circuit turns an EL lamp on or off and, when off, blocks all current from the lamp.

Lamp 32 is coupled to terminal A by a bidirectional switch formed by diode 46 series coupled with transistor 51 and by-passed by oppositely poled diode 47. Lamp 32 is coupled to terminal B by a bidirectional switch formed by diode 48 series coupled with transistor 52 and by-passed by oppositely poled diode 49. By oppositely poled is meant that the current paths are anti-parallel; that is, the paths are unidirectional and flow in opposite directions.

Resistors 41, 42, 43, and 44 provide bias for operating transistors 51 and 52. The switching circuit is symmetrical about EL lamp 32. That is, current flowing in either direction through the circuit encounters the same number of diode voltage drops and transistors of the same type.

Terminal 35 is a logic level input. "Positive" logic is used; i.e., approximately +5 volts is "true" or "high" or "on" while approximately 0 volts is "false" or "low" or "off." As can be seen by inspection of FIG. 2, terminal A and terminal B receive lamp operating voltage, not a control signal or a logic level voltage. As such, "high" means a voltage greater than 80 VDC and "low" means substantially ground potential (within two or three diode forward voltage drops of ground). The exact voltages are not critical. Terminals A and B are never high simultaneously.

When terminal A is high, current flows from terminal A through lamp 31 to terminal B. When terminal B is high, current flows from terminal B through lamp 31 to terminal A.

When input 35 is low, current does not flow through lamp 32 regardless of the state of terminals A and B. When terminal A is high, a small current flows through diode 47, the collector—base junction of transistor 51, and resistor 42 to ground at input 35. This small current forward biases diode 47, coupling the upper terminal of EL lamp 32 to terminal A. The lower terminal of EL lamp 32 is isolated from ground by transistor 52 and diode 49. No current flows through EL lamp 32 to ground. Similarly, when terminal B is high, a small current flows through diode 49 but no current flows through EL lamp 32.

When input 35 is high, transistors 51 and 52 are enabled, although not necessarily conducting. If terminal A is low, then transistor 51 conducts. If terminal B is low, then transistor 52 conducts.

When input 35 is high and terminal A is high, current flows through diode 47, EL lamp 32, transistor 52, and diode 48 to terminal B. When input 35 is high and terminal B is high, current flows through diode 49, EL lamp 32, transistor 51, and diode 46 to terminal B. Thus, an alternating current is provided for EL lamp 32. The currents in the first half cycle are symmetrical with the currents in the second half cycle because the switching circuit is symmetrical about lamp 32. There is no net DC from lamp operation and there is no minuscule DC when the switching circuit is off (when input 35 is low).

The invention thus provides a switch for selectively driving lamps in an EL panel while blocking current in the off state. The switch is symmetrical, including transistor type, and can be replicated economically to provide individual control for a plurality of lamps. The switching circuit can be added to existing drivers and can be incorporated into a single integrated circuit for new drivers.

Having thus described the invention, it will be apparent to those of skill in the art that various modifications can be made within the scope of the invention. For example, the discharge circuit described in U.S. Pat. No. 6,204,609 (Kimball) can also be incorporated into the driver circuit. More than one EL lamp can be operated by a single switching circuit.

The invention claimed is:

1. In a power supply for driving an EL panel, said power supply including an inverter that produces a polarity reversing voltage at a pair of output terminals, the improvement comprising:
    a switching circuit for coupling an EL lamp to the power supply, the switching circuit including a first bidirectional switch connecting a first terminal of an EL lamp to a first output terminal and a second bidirectional switch connecting a second terminal of the EL lamp to a second output terminal.

2. The power, supply as set forth in claim 1 wherein each bidirectional switch includes:
    a first diode coupled in series with a first transistor; and
    a second diode coupled anti-parallel with the first diode and the first transistor.

3. The power supply as set forth in claim 1 wherein each bidirectional switch includes a logic level input for turning the bidirectional switch on or off.

4. The power supply as set forth in claim 3 wherein each bidirectional switch blocks current from said EL lamp when the bidirectional switch is in the off state.

5. The power supply as set forth in claim 1 wherein the improvement comprises:
- a plurality of switching circuits coupled to said output terminals and coupled one each to the EL lamp in said EL panel for selectively lighting a plurality of EL lamps.

6. The power supply as set forth in claim 5 wherein each bidirectional switch includes:
- a first diode coupled in series with a first transistor; and
- a second diode coupled anti-parallel with the first diode and the first transistor.

7. The power supply as set forth in claim 5 wherein each bidirectional switch includes a logic level input for turning the bidirectional switch on or off.

8. The power supply as set forth in claim 7 wherein each bidirectional switch blocks current from said EL lamp when the bidirectional switch is in the off state.

* * * * *